UNITED STATES PATENT OFFICE.

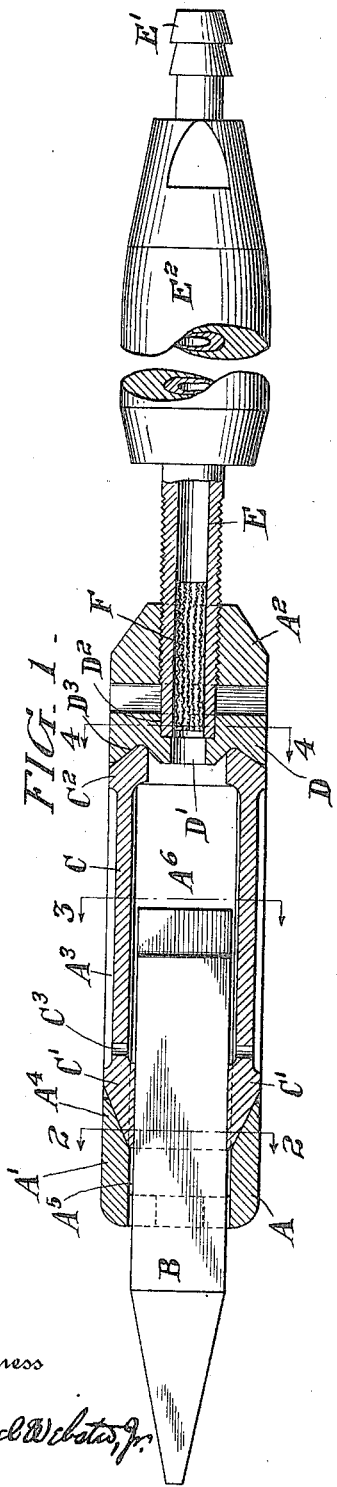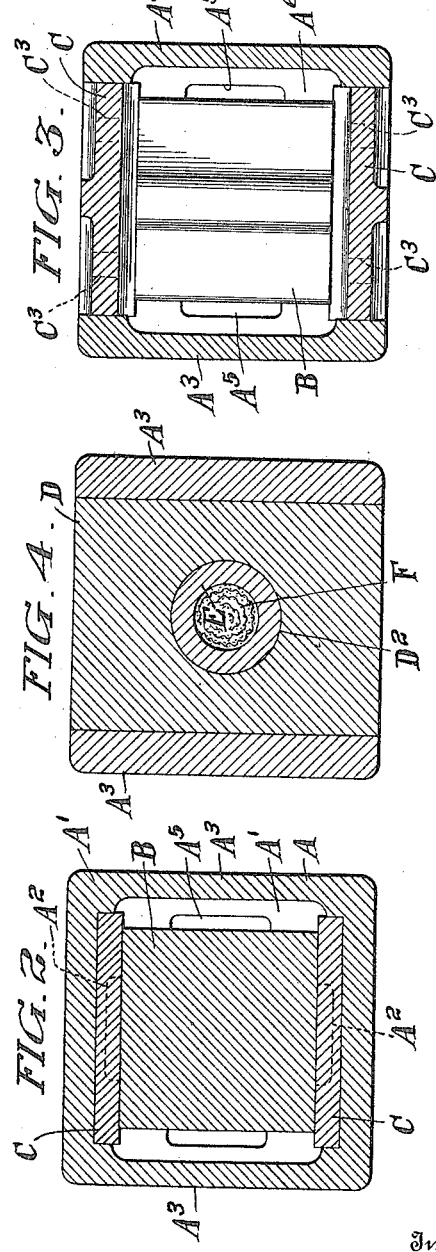

HANS ZIMMERMANN, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA.

SOLDERING-IRON.

1,180,098.  Specification of Letters Patent.  Patented Apr. 18, 1916.

Application filed December 29, 1915. Serial No. 69,133.

*To all whom it may concern:*

Be it known that I, HANS ZIMMERMANN, a subject of the German Empire, residing in the city and county of Philadelphia, in the State of Pennsylvania, have invented certain new and useful Improvements in Soldering-Irons, of which the following is a true and exact description, reference being had to the accompanying drawings, which form a part thereof.

My present invention is an improved soldering iron of the gas heated type, and has for its object to provide a soldering iron of relatively simple and inexpensive construction and comprising a hot point and a holder therefor formed with a combustion chamber into which the body of the hot point extends, and having provisions for readily securing the hot point in, and releasing it from, the holder, and for securing an effective transfer of heat to the hot point directly from the burning gases and indirectly through the holder.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings: Figure 1 is an elevation with parts in longitudinal section of my improved soldering iron construction; Figs. 2, 3 and 4 are transverse sections taken on the lines 2—2, 3—3, and 4—4 respectively of Fig. 1.

My improved soldering iron in the form shown in the drawings, comprises a member A which forms the body portion of a holder in which the hot point B is releasably secured. The latter is rectangular in cross section and has its front end tapered in the usual manner. The member A is formed with a front end portion $A'$, a rear end portion $A^2$, and a pair of parallel, spaced apart portions $A^3$ connecting the two end portions. The front end portion $A'$ is formed with an axial passage way through which the hot point B extends. The front end portion $A'$ is also formed with beveled seats $A^4$ for an opposed pair of clamping jaws C. The wedge shaped front end portions $C'$ of the clamping jaws C jam between the tapered seats $A^4$ and the adjacent flat sides of the hot point B to clamp the latter in place. The jaws are forced into the clamping position by means of a follower D which fits between the side portions $A^3$ and is formed with sockets or grooves $D^3$ in its front end to receive the correspondingly shaped rear ends $C^2$ of the clamping jaws C. As shown the member D is formed with an axial passage $D'$ enlarged at its rear end to form a socket $D^2$ receiving the end of a fuel supply pipe F which is externally threaded and is screwed through a threaded axial passage way formed in the rear end portion $A^2$ of the holder body. By rotating the tube E relative to the holder body A it is thus possible to rigidly clamp the hot point in place, or release it to permit its withdrawal or adjustment. The tube E is shown as surrounded by the usual insulated hollow handle $E^2$, and at its rear end the tube is formed with provisions $E'$ for the attachment of a fuel supply hose. The jaw members C are of a width to snugly fit between the opposed side portions $A^3$, and unite with the latter to form the side walls of the combustion chamber which is generally rectangular in cross section and is closed at its rear end by the member D.

The rear end of the hot point projects a considerable distance into the combustion chamber and advantageously as shown in Fig. 3, an appreciable clearance is provided between the portion of the hot point projecting into the combustion chamber and the adjacent wall of the latter. As shown, longitudinal grooves or channels $A^5$ are formed in the inner wall of the passage way for the hot point and lead from the combustion chamber through the front end portion $A'$ of the holder. Small ports $C^3$ may be formed, as shown, through the jaw members C adjacent their front end, to facilitate the ignition of the fuel supplied to the combustion chamber through the pipe E and the port $D'$. The soldering iron shown is intended to be heated by the combustion of air and gas supplied to the combustion chamber $A^6$ through the pipe E and the port $D'$ in the member D, in the proportion necessary for complete combustion. A roll of gauze F or equivalent means may be placed in the forward end of the tube E to chill the flame and to prevent it from striking back.

The soldering iron construction described is obviously simple, and durable, and relatively inexpensive to manufacture. The hot point may be readily connected to and disconnected from the holder in any desired adjustment and when secured in place is held very rigidly and securely. The construction disclosed insures a highly efficient utilization of the heat generated in the combustion chamber. The heat absorbed by the walls of the combustion chamber is very largely transmitted to the hot point through the contact of the latter with the wedge shaped ends C' of the jaws C, and through the end portion A' of the holder.

While in accordance with the provisions of the statutes I have illustrated and described the best form of my invention now known to me, it will be obvious to those skilled in the art that changes may be made in the form of apparatus disclosed without departing from the spirit of my invention and that in some cases certain features of my invention may be used without a corresponding use of other features.

Having now described my invention, what I claim as new and desire to secure by Letters Patent, is:—

1. In a gas heated soldering iron, the combination with the hot point, of a holder therefor formed with a combustion chamber, a pipe for supplying fuel to said chamber rotatively mounted in said holder, and means actuated by the rotative movement of said holder and pipe for detachably securing said hot point to said holder.

2. In a gas heated soldering iron, the combination with the hot point, of a holder therefor formed with a combustion chamber and a passage through which the hot point projects into said chamber, and comprising a chambered body portion with lateral openings in the wall thereof, and movable clamping jaws located in said openings uniting with said body portion to form a portion of the wall of said combustion space and to secure the hot point in said passage.

3. In a gas heated soldering iron, the combination with a hot point, of a holder therefor comprising a body member formed with front and rear end portions and a pair of parallel spaced apart side portions connecting said end portions, said front end portion being formed with a passage way for the hot point and said rear end portion being formed with a threaded opening, a pair of clamping jaws coöperating with said front end portion to clamp the hot point in place and uniting with said side portions to form the lateral walls of a combustion chamber, a follower engaging the rear ends of said jaws and uniting with said side portions to form the rear end of said combustion chamber, and a fuel supply pipe threaded through said threaded opening, and engaging said follower to advance said jaws and thereby clamp the hot point in place, said follower being formed with a passage through which the fuel passes from said supply pipe into said chamber.

4. In a gas heated soldering iron, the combination with the hot point, of a holder therefor formed with a combustion chamber and a passage through which the hot point projects into said chamber, and comprising a body portion and movable clamping jaws uniting with said body portion to form a portion of the wall of said combustion space and to secure the hot point in said passage, and a pipe supplying fuel to said chamber rotatively mounted in said holder and adapted to tighten and release said jaws when turned relatively to the holder in one direction or the other.

HANS ZIMMERMANN.

Copies of this patent may be obtained for five cents each, by addressing the "Commissioner of Patents, Washington, D. C."